United States Patent [19]
Mitchell et al.

[11] Patent Number: 5,275,196
[45] Date of Patent: Jan. 4, 1994

[54] PRESSURE RELIEF VALVE FOR TIRE RIM

[75] Inventors: Hugh A. Mitchell, 3212 Via Pescado, Carlsbad, Calif. 92008; Hal D. Mitchell, Watsonville, Calif.

[73] Assignee: Hugh A. Mitchell, San Diego, Calif.

[21] Appl. No.: 47,396

[22] Filed: Apr. 19, 1993

[51] Int. Cl.$^5$ .............................................. F16K 15/20
[52] U.S. Cl. .................................... 137/224; 137/467
[58] Field of Search ................ 137/467, 519.5, 539, 137/224, 230

[56] References Cited

U.S. PATENT DOCUMENTS

| | | | |
|---|---|---|---|
| 2,670,755 | 3/1954 | Kendrick | 137/467 |
| 3,766,940 | 10/1973 | Mason | 137/519.5 X |
| 4,365,643 | 12/1982 | Masclet et al. | 137/224 |

FOREIGN PATENT DOCUMENTS 191717  8/1986  European Pat. Off. ............ 137/224

*Primary Examiner*—Stephen M. Hepperle
*Attorney, Agent, or Firm*—Brown, Martin, Haller & McClain

[57] ABSTRACT

A pressure relief valve for a tire rim in which a valve body has first and second chambers separated by a restricted passageway of reduced dimensions. The valve body has an inlet connected to the first chamber, and an outlet connected to the second chamber, and can be mounted in a suitable opening in a tire rim with the inlet exposed to pressure within the tire and the outlet exposed to the atmosphere outside the tire. A valve member is normally located in the first chamber and is seated against a seat at the entrance to the restricted passageway by air pressure within the tire acting on it via the inlet, sealing the outlet. Either the valve member or the walls of the passageway, or both, are made of deformable elastomeric material so that when the air pressure rises above a predetermined safety level, the ball is forced through the passageway into the second chamber into a position in which air can flow past the ball and out through the outlet, reducing the internal pressure in the tire.

13 Claims, 1 Drawing Sheet

PRESSURE RELIEF VALVE FOR TIRE RIM

BACKGROUND OF THE INVENTION

The present invention relates generally to pressure relief valves, and is particularly concerned with a pressure relief valve for a tire rim.

Pneumatic tubeless tires are traditionally mounted on tire rims by filling the tire with air, the internal pressure in the tire forcing the tire onto the tire seat at the rim. This can be a dangerous procedure, since over-inflation of tires can occur, particularly where parts are mismatched. Such over-inflation will eventually cause the tire to explode or the wheel itself to break, potentially maiming or even killing the tire changer or other persons in the vicinity. Many injuries and deaths have occurred as a result of such accidents.

SUMMARY OF THE INVENTION

It is an object of the present invention to provide a pressure relief valve for a tire rim to prevent or reduce the risk of tire over-inflation.

According to the present invention, a pressure relief valve is provided which comprises a valve body having first and second internal chambers separated by a restricted passageway of reduced dimensions. The valve body has an inlet connected to the first chamber and an outlet connected to the second chamber. A valve member is normally positioned in the first chamber, but is moveable through the restricted passageway into the second chamber on exposure to pressures above a predetermined level. The restricted passageway acts as a valve seat for sealing engagement with the valve member on exposure to pressures below the predetermined level at the valve inlet. Either the valve seat or the valve member is of deformable material so that the valve member can be forced through the valve seat by pressures above a predetermined level. A stop device in the second chamber retains the valve member in a vent position permitting gas flow past the valve member and out through the outlet. A mounting device is provided for mounting the valve body in an opening on a tire rim so that the inlet is exposed to pressure within the tire and the outlet is exposed to the external or atmospheric pressure.

The valve is set at an appropriate safety level so that the valve member is forced through the valve seat into the venting position before the tire becomes overinflated to a dangerous level. Preferably, the valve member can be forced back through the passageway into the first chamber after venting, simply by applying sufficient gas pressure at the outlet. Thus, the valve can be reset easily after actuation as a result of excessive internal pressure in the tire, once the tire has been vented.

In a preferred embodiment of the invention, the valve seat itself is of deformable material and is adjustable to vary the actuation pressure level. The valve body may comprise a tubular member of deformable material, with a suitable clamping device for adjustably compressing the tubular member at a location intermediate its ends to form the restricted passageway, the clamping device being adjustable to vary the dimensions of the passageway and thus the pressure level at which the valve member will pass through the passageway into the venting position in the second chamber.

This pressure relief valve is reliable and relatively inexpensive, and has the potential for preventing many injuries and deaths by avoiding or considerably reducing the risk of tire explosion as a result of over-inflation.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figures 1, 2, 3:
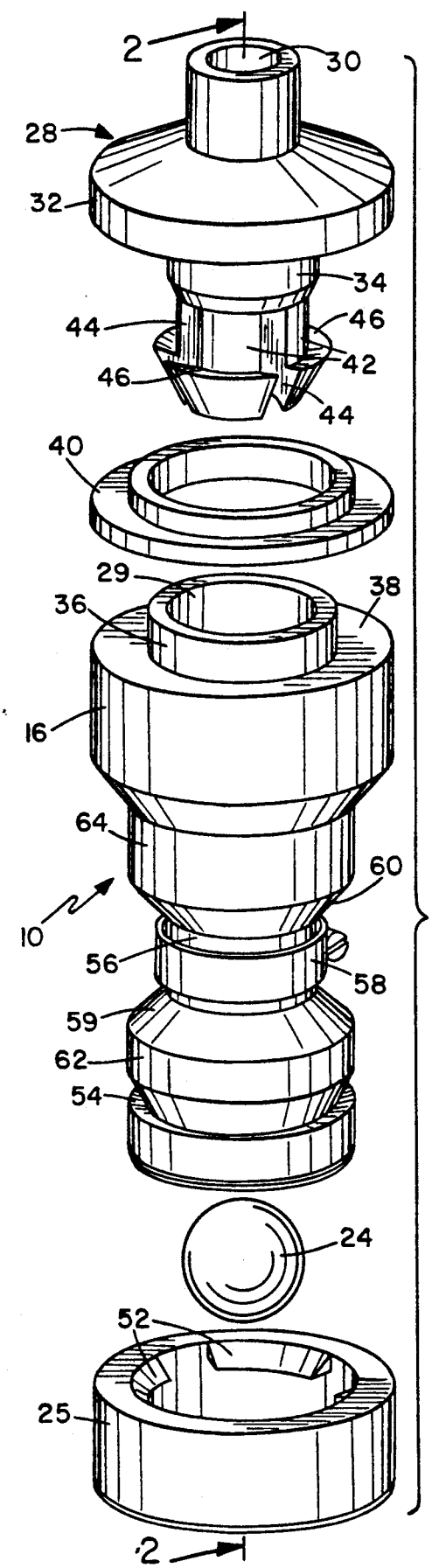
FIG. 1 is an exploded perspective view of the components of a pressure relief valve according to a preferred embodiment of the invention.
FIG. 2 is a sectional view taken on line 2—2 of FIG. 1, with the valve assembled and installed in a wheel rim.
FIG. 3 is a sectional view taken on line 3—3 of FIG. 2.

FIG. 1 of the drawings illustrates a pressure relief valve 10 according to a preferred embodiment of the present invention, while FIG. 2 illustrates the valve installed in an opening 12 in a wheel or tire rim 14. Valve 10 basically comprises a valve body 16 having first and second internal chambers 18, 20 connected by a restricted passageway 22, and a valve member or ball 24 which is initially positioned in the first chamber 18 in a normal operating position. Valve body 16 has an end cap 25 forming one end of chamber 18, the cap 25 having an inlet opening 26 communicating with chamber 18. A plug member 28 is designed to fit onto the opposite, open end 29 of the valve body and to secure the valve body to the opening 12. Plug member 28 has a through bore 30 forming an outlet from chamber 20 to the exterior of the tire rim.

Plug member 28 has an annular shoulder or skirt 32 for fitting against the outside of tire rim 14 and a downwardly depending stem 34 for projecting through the opening 12 into the open end of the valve body. The valve body is made of an elastomeric material such as resilient plastic or rubber, and has an outlet end or neck 36 of reduced diameter and an annular shoulder 38 for retaining a sealing ring 40 between the shoulder 38 and the inner surface of tire rim 14. Sealing ring 40 is also of elastomeric material. Plug stem 34 has a plurality of resilient fingers 42 with slots 44 between adjacent fingers, as best illustrated in FIGS. 1 and 3. Each finger 42 has an angled, hook-like projection 46 on its outer surface which is a snap fit in a correspondingly shaped notch or angled shoulder 48 in chamber 20 when the stem 34 is pushed through the open end of the chamber into the locked position illustrated in FIG. 2. As the stem is pushed into the chamber, the fingers will first be compressed and will then snap outwardly when pushed beyond notch 48, securing the plug member to the valve body and mounting the valve assembly to the tire rim. The end faces 50 of fingers 42 are rounded to form a part-spherical valve seat.

End cap 24 also has hook projections 52 on its inner surface which are designed to be a snap fit in a corresponding notch or angled groove 54 provided on the outer surface of the valve body 16. Valve body is basically cylindrical, with a reduced diameter portion 56 intermediate its ends forming the restricted passageway 22 between the chambers 18 and 20. An adjustable ring clamp 58 extends around the reduced diameter or waist portion 56 for adjusting the dimensions of the restricted passageway. Tapered portions 59, 60 extend from waist portion 56 to the adjacent, larger diameter portions 62, 64 of the valve body. The inner wall of tapered portion 59 is rounded to form a part-spherical seat 65 for valve ball 24 in the normal operating position illustrated in FIG. 2.

As discussed above, the valve body is formed of elastomeric, deformable material. Preferably, the plug is also formed of elastomeric material. The valve ball 24 is also formed of a suitable elastomeric material designed to deform on application of relatively high pressure.

Operation of the valve assembly will now be described in more detail. In order to install the valve assembly, an opening 12 is first made in the tire rim. The valve body is then placed on the inner surface of the rim with neck 36 projecting up through opening 12 and the sealing member 40 clamped between the valve body shoulder 38 and the tire rim. The stem of plug member 28 is then pushed down through the opening in neck 36 and into the chamber 20, until the projections 46 snap into place beneath notch or shoulder 48. The plug member is now permanently connected to the valve body. Chamber 18 will then be exposed to the internal pressure of a tire inflated on rim 14.

As the tire is inflated, air pressure at inlet 26 will apply pressure in the direction of arrow 66 on the ball 25, which will be urged against the valve seat 65, sealing the passageway 22 and blocking air flow through the valve body, as illustrated in FIG. 2. If the air pressure in the tire exceeds a predetermined safety level above which explosion might occur, the ball will be forced through passageway 22, and will travel into chamber 20, into the dotted line position illustrated in FIG. 2. The air pressure at which the ball will pass into chamber 20 will be determined by the size of passageway 22, and can be adjusted by adjustment of clamp ring 58. Preferably, the passageway and ball are dimensioned and the elastomeric materials are selected such that the ball will be forced into chamber 20 when the internal pressure exceeds a selected safety level, which may be anything from 10 p.s.i. to 100 p.s.i. or more, depending on the type of tire. Either the passageway or the ball, or both, are formed of elastomeric material. Thus, the ball may expand the deformable material of the passageway to be forced through into the second chamber, or the ball itself may be deformed so that it can pass through the passageway. Where both the passageway and the ball are deformable, the ball material will deform and will also expand the passageway walls. The ball may be of any material such as steel, glass or plastics and rubber of different hardness. In a preferred example of the invention, the ball was made of a mixture of silicone rubber of a type which has low volatility, high temperature resistance and is very stable, such as Permatex Corporation's High Temp RTV Silicone Gasket Maker, part #27B. This has the advantage of accurate pressure level settings at the lower pressures.

When the ball enters chamber 20, it will be urged into an air venting position against the valve seat formed by the rounded ends 50 of fingers 42, as illustrated in dotted outline in FIG. 2. Since the diameter of chamber 20 is greater than that of ball 24, air can flow through the valve body and out through outlet 30 when the ball is seated against fingers 42, as indicated by the arrows 68. Air will flow past ball 24 and through slots 44 into the central through bore or outlet passageway 30. Thus, the tire pressure will be vented and over-inflation of the tire will be prevented.

Once the ball has been forced through to chamber 20, it can be returned to its normal operating position in chamber 18 for subsequent tire inflations, simply by applying air pressure to the outer end of plug member 28. This will blow the ball back through deformable passageway 22 into chamber 18, resetting the valve. The ball 20 acts as a check valve and is forced against orifice 26 on reset to prevent inflation of the tire via outlet 30.

The pressure relief valve assembly described above is particularly intended for use in a tire rim to avoid over-inflation of tires, and thus to reduce the risk of tires exploding and potentially causing injury or death. However, it could also be used in other applications where a pressure relief valve is needed for safety or other reasons. The valve assembly itself is relatively inexpensive and easy to manufacture and install on tire rims, and will considerably reduce the risk of tires exploding and causing accidents as a result of over-inflation.

Although a preferred embodiment of the invention has been described above by way of example only, it will be understood by those skilled in the field that modifications may be made to the disclosed embodiment without departing from the scope of the invention, which is defined by the appended claims.

We claim:

1. A pressure relief valve assembly for a tire rim, comprising:
   a valve body having first and second chambers, an inlet communicating with the first chamber, an outlet communicating with the second chamber, and a restricted passageway of reduced dimensions connecting the first chamber to the second chamber;
   mounting means for mounting the valve body in an opening in a tire rim with the inlet communicating with the interior of a tire and the outlet communicating with the exterior of the tire;
   a valve member in the valve body moveable between a first position in the first chamber and a second position in the second chamber dependent on the pressure within the tire;
   the restricted passageway being of smaller crosssectional dimensions than said valve member and having a valve seat for sealing engagement with the valve member in said first position when the pressure within the tire is below a predetermined level to prevent gas flow from said first chamber to said second chamber;
   at least one of the valve seat and valve member being formed of deformable, elastomeric material comprising means for deforming on exposure to pressure within the tire above said predetermined level to allow said valve member to pass through said passageway into said second chamber; and
   stop means for retaining said valve member in said second position in said second chamber, said stop means including a vent passageway for permitting gas flow past said valve member and out through said outlet.

2. The assembly as claimed in claim 1, wherein said second chamber has an open outlet end and said mounting means comprises a plug member having a stem for releasable snap engagement in the open outlet end of said second chamber, the plug member having a through bore comprising the outlet of said second chamber.

3. The assembly as claimed in claim 2, wherein said plug member has an annular rim for engaging the outer surface of the tire rim surrounding the opening and the valve body has a corresponding annular shoulder for clamping the tire rim between the annular shoulder and the annular rim of the plug to secure said valve body in the opening.

4. The assembly as claimed in claim 3, including an annular seal member for fitting over the annular shoulder of the valve body for sealing between the shoulder and the inner surface of the tire rim when the valve body is mounted in the opening.

5. The assembly as claimed in claim 2, wherein the stem of the plug member includes a plurality of spaced fingers with slots between the fingers, the fingers having outward projections and the second chamber having mating means for releasable snap engagement with the outward projections when the stem is engaged in said chamber.

6. The assembly as claimed in claim 5, wherein the fingers have free ends comprising seat means for seating said valve member when said valve member is forced into said second chamber, said seat means comprising said stop means, said valve member being of smaller cross-sectional dimensions than said second chamber so that air can travel past said valve member and through said slots into said outlet passageway when said valve member is seated against the free ends of said fingers, said slots comprising said vent passageway.

7. The assembly as claimed in claim 1, wherein at least the restricted passageway of said valve body is formed of deformable elastomeric material.

8. The assembly as claimed in claim 7, including adjustment means for adjusting the dimensions of said passageway to vary the pressure at which said valve member is forced through said passageway.

9. The assembly as claimed in claim 8, wherein said adjustment means comprises a clamp ring extending around the periphery of said valve body at said restricted passageway.

10. The assembly as claimed in claim 1, wherein the valve body is of elastomeric material.

11. The assembly as claimed in claim 1, wherein the valve member is of elastomeric material.

12. The assembly as claimed in claim 1, wherein the valve member comprises a ball.

13. The assembly as claimed in claim 1, wherein said valve body is movable in a return direction from said second chamber back into said first chamber on exposure to air pressure at said outlet, and further comprises means for blocking said inlet on exposure to air pressure through said outlet to prevent inflation of said tire via said outlet.

* * * * *